(12) United States Patent
Sar et al.

(10) Patent No.: US 8,727,079 B2
(45) Date of Patent: May 20, 2014

(54) STRUCTURAL MEMBER WITH CLAMPING PRESSURE MECHANISM

(75) Inventors: David R. Sar, Corona, CA (US); Terry M. Sanderson, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 343 days.

(21) Appl. No.: 13/227,747

(22) Filed: Sep. 8, 2011

(65) Prior Publication Data

US 2012/0061196 A1 Mar. 15, 2012

Related U.S. Application Data

(60) Provisional application No. 61/381,249, filed on Sep. 9, 2010, provisional application No. 61/381,254, filed on Sep. 9, 2010.

(51) Int. Cl.
*E04C 3/00* (2006.01)
*B64C 3/48* (2006.01)

(52) U.S. Cl.
USPC ............................ 188/266; 52/839; 244/123.1

(58) Field of Classification Search
USPC .............. 244/123, 131, 133, 123.1; 188/266, 188/378; 52/839
See application file for complete search history.

(56) References Cited

U.S. PATENT DOCUMENTS

| | | | |
|---|---|---|---|
| 5,269,657 A | 12/1993 | Garfinkle | |
| 5,712,011 A | 1/1998 | McMahon et al. | |
| 5,931,263 A * | 8/1999 | Ericson et al. | 187/373 |
| 6,655,633 B1 * | 12/2003 | Chapman, Jr. | 244/123.9 |
| 7,384,016 B2 * | 6/2008 | Kota et al. | 244/123.1 |
| 7,841,559 B1 * | 11/2010 | O'Shea | 244/46 |
| 8,087,499 B1 * | 1/2012 | McKnight | 188/266 |
| 2003/0146346 A1 * | 8/2003 | Chapman, Jr. | 244/123 |
| 2003/0173460 A1 * | 9/2003 | Chapman, Jr. | 244/123 |
| 2008/0257085 A1 * | 10/2008 | Bless et al. | 74/421 R |
| 2012/0061888 A1 * | 3/2012 | Sar et al. | 267/136 |

FOREIGN PATENT DOCUMENTS

| | | |
|---|---|---|
| DE | 10138250 A1 | 9/2002 |
| DE | 102006043876 A1 | 4/2008 |
| EP | 0886078 A2 | 12/1998 |
| GB | 2235733 A | 3/1991 |

OTHER PUBLICATIONS

International Search Report and Written Opinion from corresponding International Application No. PCT/US11/50784.

* cited by examiner

*Primary Examiner* — Christopher Schwartz
(74) *Attorney, Agent, or Firm* — Renner, Otto, Boisselle & Sklar, LLP

(57) ABSTRACT

A structural member includes a box structure that encloses a beam, which may be a split beam or a split segmented beam. The structural member includes a pressure mechanism that varies a pressure force or a friction force between the beam and the box structure. Movement of the parts within the box structure, against the force of the pressure mechanism, as the structural member flexes, dissipates energy and adds to the damping of the structural member.

22 Claims, 4 Drawing Sheets

STRUCTURAL MEMBER WITH CLAMPING PRESSURE MECHANISM

This application claims priority under 35 USC 119 to U.S. Provisional Application No. 61/381,249, filed Sep. 9, 2010, and to U.S. Provisional Application No. 61/381,254, filed Sep. 9, 2010. Both of the above applications are incorporated herein by reference in their entireties.

BACKGROUND OF THE INVENTION

1. Field of the Invention

The invention is in the field of stiff structural members, such as aircraft spars and other structural members that undergo cantilever forces or cantilever-like forces.

2. Description of the Related Art

Mechanically stiff structural members, such as wing spars, typically have very low damping constants. Traditionally, stiff structural members such as those used in aircraft spars have been subject to resonances that limit the performance capabilities of the structure. This results in structures having distinct resonances which can be excited, such as (for wing spars) by flight conditions. These resonances can be in the form of the fundamental cantilever resonance frequency, or can be in the form of higher modes such as those encountered during "flutter" of aerodynamic control surfaces, in which the resonant characteristics of the wing couple to the airflow past the wing. Resonances can cause reduced range/performance, difficulty in attitude control, and flutter and/or structural failure, to name just a few potential problems. FIG. 1 illustrates resonance in a typical spar 10.

SUMMARY OF THE INVENTION

According to an aspect of the invention, stiff structural members possess vibration damping constants on the order of critical.

According to another aspect of the invention, one or more mechanisms may be used to vary the clamping force on the split beam friction damping structure as a function of cantilever displacement. This more accurately approximates a critically damped structure, and simultaneously solves the problem of "dry locking hysteresis."

According to still another aspect of the invention, a structural member includes: an external box structure; and a split segmented beam within the box structure. The structural member may include one or more of the following features: the split segmented beam includes a pair of longitudinally-split beam parts; portions of the beam parts extend into a structure root to which the external box is attached; the beam parts are able to "float" within the box structure; the box structure puts a pressure force on the beam parts; a pressure mechanism (friction-varying mechanism) is between the box structure and the beam parts; the pressure mechanism varies the pressure force as the member flexes; the pressure mechanism includes a series of hinged "scissors jack" mechanisms; the pressure mechanism includes a series of toothed elliptical cam gears that engage toothed or grooved surfaces in the beam parts and/or the box structure; a lubricant layer is located between the beam parts, with the beam parts able to slide relative to each other as the structural member flexes; the external box structure is a square or other rectangular channel; and/or the beam parts are shorter than the length of the box, allowing segments of the beam parts to move longitudinally within the box.

According to a further aspect of the invention a structural member includes: an external box structure; a beam movable within the box structure; and a pressure mechanism that provides variable friction between the box structure and the beam.

To the accomplishment of the foregoing and related ends, the invention comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF THE DRAWINGS

The annexed drawings, which are not necessarily to scale, show various aspects of the invention.

DETAILED DESCRIPTION

A structural member includes a box structure that encloses a beam, which may be a split beam or a split segmented beam. The structural member includes a pressure mechanism that varies a pressure force or a friction force between the beam and the box structure. Movement of the parts within the box structure, against the force of the pressure mechanism, as the structural member flexes, dissipates energy and adds to the damping of the structural member.

Figure 1:
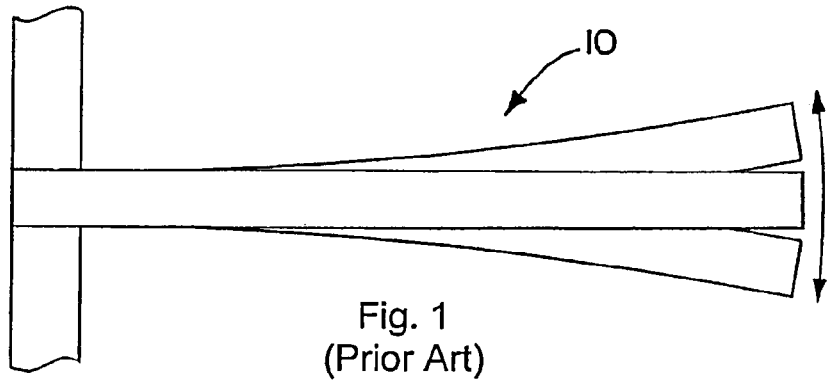
FIG. 1 is a side view illustrating forces on a cantilever beam.
Figure 2:
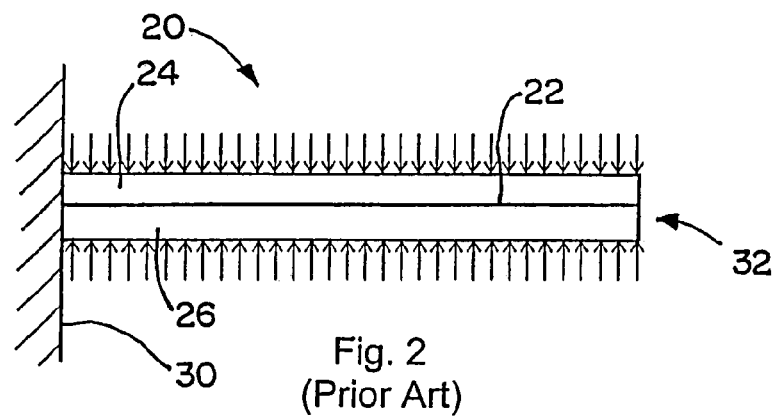
FIG. 2 is a side view illustrating a prior art split beam arrangement.
Figure 3:
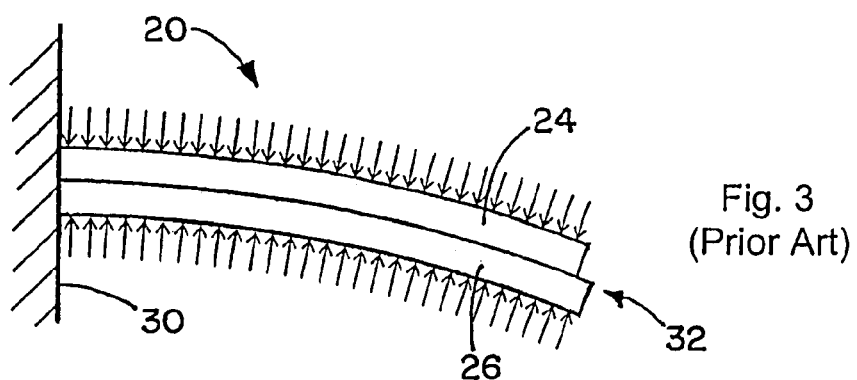
FIG. 3 is a side view showing the beam of FIG. 2 under load.

Referring now to FIGS. 2 and 3, in the publication "Analysis of Slip Damping With Reference to Turbine Blade Vibration" L. E. Goodman and J. H. Klumpp, Journal of Applied Mechanics, September 1956, the authors looked at a situation in which a beam 20 is sliced longitudinally along its length, with the plane 22 of the slice being perpendicular to any potential cantilever forces. The damping comes from the two halves 24 and 26 of the sliced beam 20 being clamped back together along their length so that, when cantilever force is applied, they could slip along the slice plane 22 with friction, which damps the energy imparted by the cantilever force.

Figure 4:
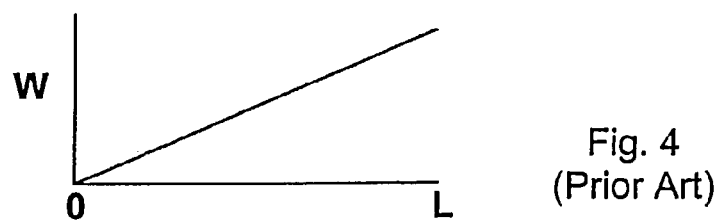
FIG. 4 is a graph qualitatively illustrating the energy dissipation in the beam of FIG. 2.

Goodman and Klumpp assumed even clamping force along entire beam 20. As is typical of friction dampers, there is an optimum clamping force that will maximize the damping. However the problem of "dry locking" was not addressed, in which the friction is high enough to prevent the beam from returning to its original position (hysteresis). For a wing spar, this hysteresis would mean that the spar would not return to its original position after removal of a load, but would remain "hung" in a deformed state. Additionally, the problem was not addressed as to how to anchor the beam halves 24 and 26 to provide an appropriate distribution of damping along the beam's length. Goodman and Klumpp's version, as applied to a wing spar, would have the beam halves firmly attached together at the wing root (corresponding to the fixed root 30 of the cantilever beam 20) and free to slip under friction going out to the wing tip (corresponding to the free end 32 of the cantilever beam 20). The energy dissipation for this would be zero at the wing root, and at a maximum at the wing tip. This distribution is illustrated in FIG. 4, which qualitatively shows energy distribution (W) versus beam length (L). This distribution is the opposite of what is desirable, since the strain energy distribution along the beam 20 is at a maximum at the root and decays to zero at the beam tip. The distribution of damping would benefit from being more even.

The present invention solves several of the problems from the prior art. The invention changes the way that the clamping force on the beam is produced, resulting in damping friction that varies as a function of cantilever displacement of the beam. The ability to vary this as a function of cantilever displacement gets around the issue of "dry locking hysteresis," which was not addressed by Goodman and Klumpp. The split beam structure and friction varying mechanisms, which are described below, would be mounted inside a box beam, which would provide structural integrity, and provide the minimum initial clamping force for the split beam structure. The split beam structure could be one single split beam pair, or sliced at right angles to the slip plane, into a number of segments. If sliced, it is possible that the slices in the top half could be staggered with respect to the slices in the lower half to minimize the introduction of planes of weakness along the spar (or other structure). The friction-varying mechanisms would be sandwiched in between the upper and lower surfaces of the split beam structure and the top and bottom of the inside of the box beam. The mechanism could consist of a series of scissor jacks which change height when compressed (as when the structure is bent). Alternately, the mechanism could consist of elliptical cam gears which would engage in gear grooves that would be cut into the top and bottom surfaces of the split beam structure and inside of the box beam. The cam gears would be oriented so that the minor axis of the ellipse is perpendicular to the slip plane when there is no cantilever displacement to the split beam structure. Upon cantilever displacement of the split beam, the cams would rotate and increase the pressure that the box beam places upon the halves of the split beam. The result would be an increase in the clamping force and damping friction as a function of cantilever displacement.

Figure 5:
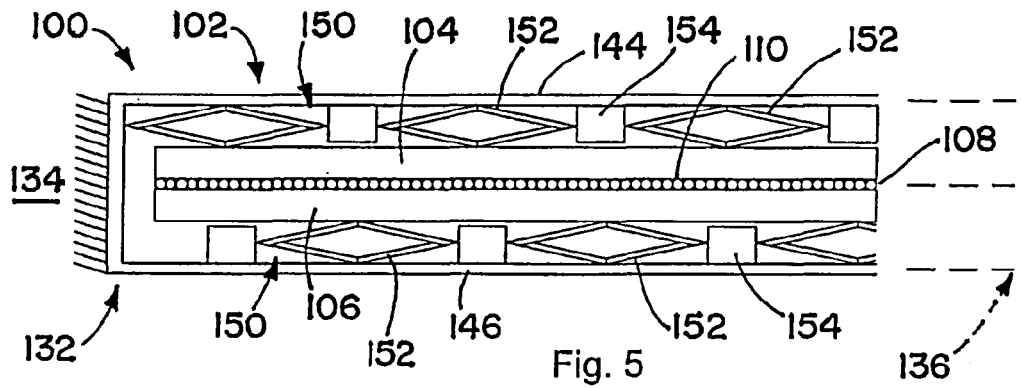
FIG. 5 is a side view showing a structural member according to an embodiment of the present invention.
Figure 6:
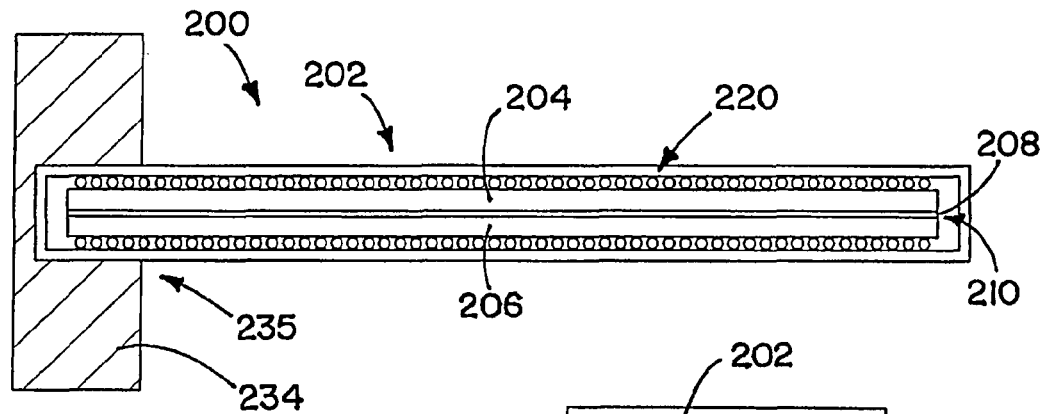
FIG. 6 is a side view showing a structural member according to an alternate embodiment of the present invention.

Referring now to FIGS. 5 and 6, a structural member 100 has an external box structure 102, with split beams halves or parts 104 and 106 inside the box structure 102. The external box structure 102 provides clamping pressure, pressing the beam parts 104 and 106 together, as well as providing structural integrity. The box structure 102 may be a square or other rectangular channel of material that surrounds and encloses the beam parts 104 and 106.

The split beam parts 104 and 106 are split longitudinally, with the top beam part 104 separated from the bottom beam part 106 along a central horizontal plane 108. A lubricant layer 110 is located at the plane 108 separating the beam parts 104 and 106. Alternatively or in addition, the beam parts 104 and 106 may have their surfaces treated, to affect the amount of sliding friction between the beam parts 104 and 106. For example, the one or both of the contacting surfaces could be sandblasted. A small amount of lubricant may be used to minimize galling, depending upon the amount of friction required for a given situation.

The ends of the beam parts 104 and 106 float unanchored. At the proximal end 132 of the structural member 100, where the structural member 100 is attached to fixed structure (root) 134, the beam parts 104 and 106 float unanchored. The proximal end 132 may be attached in a recess (not shown) in the root structure 134. At the distal end 136 of the structural member 100, the beam parts 104 and 106 float unanchored.

The beam parts 104 and 106 are somewhat shorter than the length of the box 102. This allows the segments of the beam parts 104 and 106 to move longitudinally within the box 102. The beam parts 104 and 106 may extend into the portion of the box 102 that is within the root structure 134, but the beam parts 104 and 106 are not fixedly attached to either the box 102 or the root structure 134.

The beam parts 104 and 106 are enclosed by a top box surface 144 and a bottom box surface 146. Pressure mechanisms 150 (friction-varying mechanisms) are provided between the box top 144 and the top beam part 104, and between the box bottom 146 and the bottom beam part 106. The pressure mechanisms 150 press against the beam parts 104 and 106 to provide friction between the beam parts 104 and 106 as the beam parts 104 and 106 slide along one another when the structural member 100 is loaded.

In the illustrated embodiment the pressure mechanisms 150 are a series of hinged scissors-jack mechanisms 152, perhaps with compressible material 154 between the mechanisms 152. The mechanisms 152 provide a compression force which serves to increase frictional force as the beam parts 104 and 106 bend and move against each other. The mechanisms 152 change height when compressed (as when the structure 100 is bent). This allows friction to be adjustable as a function of bending. It will be appreciated that the mechanisms 152 may be configured to adjust the frictional damping to where it is desired, such more evenly distributed along the structural member 100 than the dissipation illustrated in FIG. 4, and/or to more closely follow the strain energy distribution along the structural member 100. A more even energy dissipation provides better damping, and advantageously dissipates more energy close to the root of the structural member 100 (at the proximal end 132 of the structural member 100).

Energy is dissipated by the frictional damping between the beam parts 104 and 106 as the beam parts 104 and 106 slide against each other. The beam shear stress drives motion along the slip plane 108, which is a maximum at the neutral axis.

The structural member 100 provides good stiffness, while also providing at least a critically damped response to vibrations, such as vibrations over the 0.1 to 10 Hz frequency band. The structural member 100 can accomplish this damping while only using conventional, as opposed to exotic, materials. In addition the damping is provided in a passive manner, in that it is built into the structural material system itself. It does not utilize any external controllers, actuators, or power sources.

The structural member 100 could be configured to provide critical damping (damping ratio of 1), or could be configured to provide a lower damping ratio, such as about 0.25. It will be appreciated that lower damping ratios would reduce shocks. For example, a wing spar having a damping ratio of about 0.25 would reduce flight shocks, especially during launch. Reducing flight shocks is desirable, since shocks and vibration adversely affect IMU (inertial measurement unit) signals, which in turn adversely affects autopilots and guidance systems. Being able to avoid or substantially reduce flight shock and vibration results in higher performing guidance systems.

The various components of the structural member 100 may be made using a variety of suitable materials. Suitable materials include steel, aluminum, titanium, and other metals and alloys. The lubricant layer 110 may include any of a variety of suitable industrial lubricants, such as a grease or oil film. Goodman and Klumpp utilized a mixture of MoS$_2$ and vegetable oil as a lubricant.

The beam parts 104 and 106 may each be a single part. Alternatively, the beam parts 104 and 106 each may consist of several segments, with gaps between the segments of each of the beam parts 104 and 106, along the length of the structural member 100. In essence the split beam structure would be sliced, at right angles to the slip plane, into a number of segments, and space (gaps) would be provided between the segments to provide for slip motion. It is possible that the slices in the top half could be staggered with respect to the slices in the lower half to minimize the introduction of planes of weakness along the spar. The internal split beam structures could be loosely constrained by dowel pins in oversized slots or some other means to provide freedom of motion while retaining the components in their approximate positions within the box beam. The segmenting of the beam parts 104 and 106 would allow clamping forces along each segment to be adjusted independently to achieve the correct level of friction and damping for a particular location along the structure.

Figure 8:
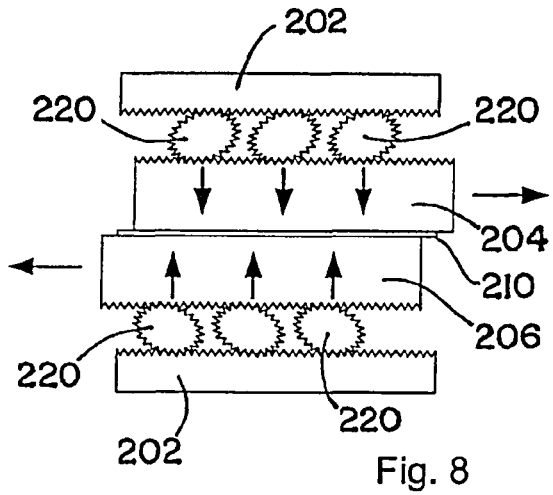
FIG. 8 is a side view showing the portion of the beam of FIG. 7, in a loaded condition.
Figure 7:
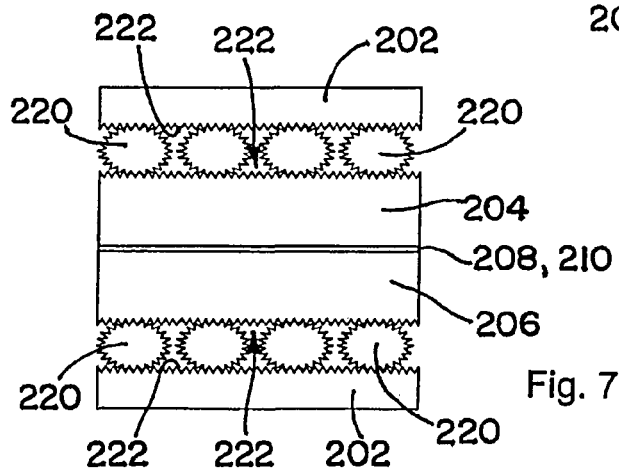
FIG. 7 is a side view showing a portion of the beam of FIG. 6, in an unloaded condition.

An alternative embodiment is shown in FIGS. 6-8, a structural member 200 having sets of toothed cam as pressure mechanisms. The structural member 200 has a box 202 with beam parts 204 and 206 inside, slideable along a slip plane 208, with a lubricant layer 210 perhaps between the beam parts 204 and 206.

Elliptical cam gears 220 engage gear grooves or teeth 222 that would be cut into the top and bottom surfaces of the split beam structure beam parts 204 and 206 and inside of the box beam 202. The cam gears 220 would be oriented so that the minor axis of the ellipse is perpendicular to the slip plane 208 when there is no cantilever displacement to the split beam structure, as shown in FIG. 7. Upon cantilever displacement of the split beam, the cams would rotate and increase the pressure that the box beam places upon the halves of the split beam, as illustrated in FIG. 8. The result would be an increase in the clamping force and damping friction as a function of cantilever displacement.

The structural member 200 is attached to root structure 234 in a recess 235 of the root structure 234. In other respects the structural member 200 may be similar to the structural member 100 (FIG. 5) that is described above. The structural member 200 may have many of the same advantages that the structural member 100 has.

It will be appreciated that similar elliptical cam gears may be utilized along the slip plane between the beam parts, engaging toothed or grooved inner surfaces of the beam parts. This may be done in either of the above embodiments, with the cam gears being used instead or in addition to a lubricant layer.

Figure 9:
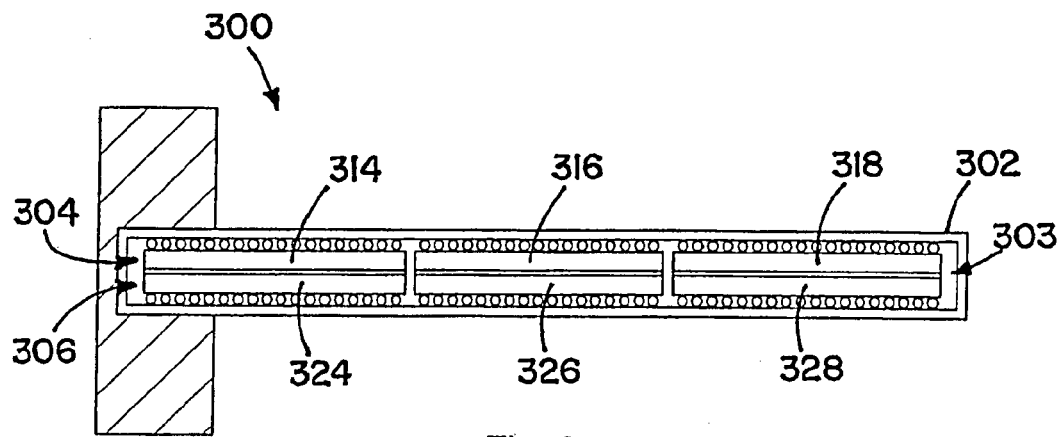
FIG. 9 is a side view illustrating an alternate embodiment structural member of the present invention.

FIG. 9 shows an alternative described above, a structural member 300 that includes an external box structure 302 with a beam 303 in it. The beam 303 includes beam parts 304 and 306 are split into segments, with the upper beam part 304 in segments 314, 316, and 318, and the lower beam part 306 in segments 324, 326, and 328. There are gaps between adjacent of the segments. It will be appreciated that the beam parts 304 and 306 may alternatively be split into a greater or lesser number of segments from what is shown in the illustrated embodiment.

Figure 10:
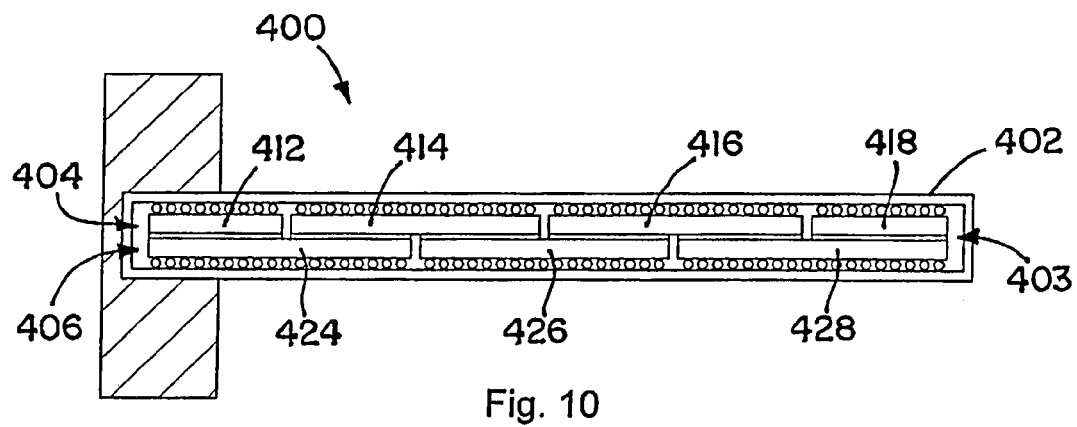
FIG. 10 is a side view illustrating another alternate embodiment structural member of the present invention.

FIG. 10 shows another alternative, a structural member 400 that includes a beam a box 402 with a beam 403. The beam 403 encloses beam parts 404 and 406. The top beam part 404 is split into four segments 412, 414, 416, and 418. The bottom beam part 406 is splint into three segments 424, 426, and 428. The beam segments are staggered, with the top part segments overlapping the gaps between the bottom half segments, and vice versa. The overlapping between the staggered segments may aid in reducing planes of weakness.

The structural members 300 and 400 are shown with cams as pressure mechanisms. Alternatively the pressure mechanisms may have other configurations, such as the pressure mechanisms 150 (FIG. 5).

Figure 11:
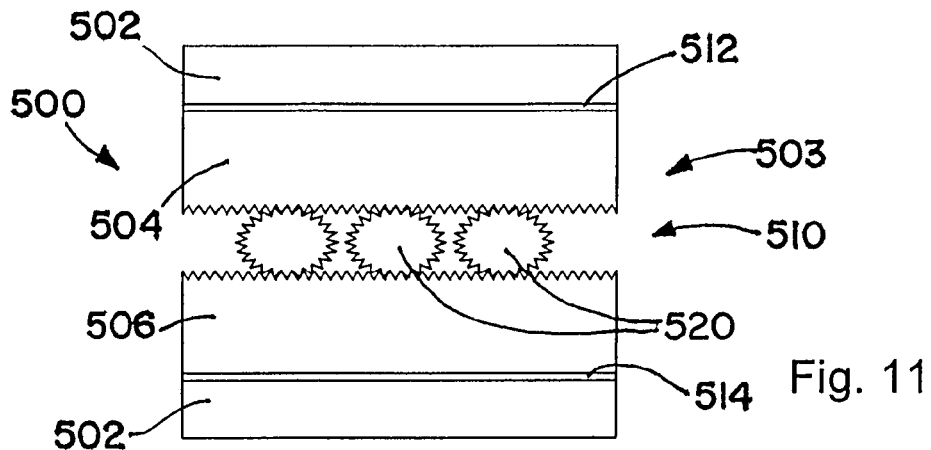
FIG. 11 is a side view illustrating yet another alternate embodiment structural member of the present invention.

FIG. 11 shows an alternate arrangement structural member 500 with an alternate pressure mechanism 510. In the pressure mechanism 510 a series of cam gears 520 is located between beam parts 504 and 506 of a beam 503, at a slip plane 508, to vary the pressure as the structural member 500 deforms. The beam parts 504 and 506 are able to slide relative to a box 502 that encloses the beam parts 504 and 506, for example with lubricant layers 512 and 514 between the box 502 and the beam parts 504 and 506. In other respects the structural member 500 may have a configuration similar to that of other embodiments disclosed herein.

Figure 12:
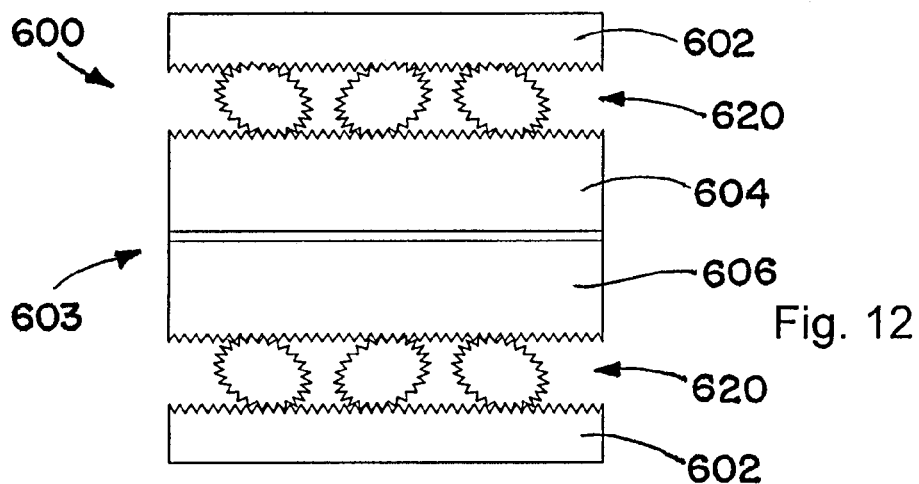
FIG. 12 is a side view illustrating still another alternate embodiment structural member of the present invention.

FIG. 12 shows another alternative, a structural member 600 in which cams, such as cam gears 620, are between a box 602, and beam parts 604 and 606 of a beam 603. The cam gears 620 have varying relative clocking, so that relative movement of the beam parts 604 and 606 produces different changes in pressure. As the structural member 600 flexes, some of the cam gears 620 may increase pressure while other of the cam gears 620 may decrease pressure. The variations in clocking allows for a variety of effects in changing pressure.

Figure 13:
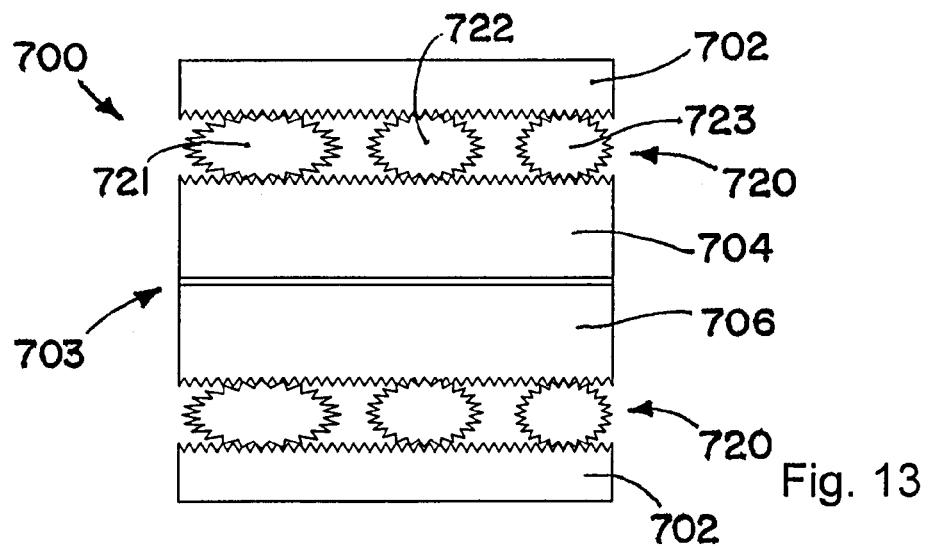
FIG. 13 is a side view illustrating a further alternate embodiment structural member of the present invention.

FIG. 13 shows a further variation, a structural member 700 in which cams, such as cam gears 720, are between a box 702, and beam parts 704 and 706 of a beam 703. The cam gears 720 have different configurations, such as different ellipticities, different aspect ratios between their minor and major axes. For example, a cam gear 721 has a greater ellipticity than a cam gear 722, which has a greater ellipticity than a substantially round gear 723. As illustrated the cam gears 720 have the same configurations above and below the beam 703, but alternatively different types of cam gear configurations may be provided at the top and the bottom of the beam 703.

The alternatives described may be combined in any of the other structural members described herein. In addition multiple of the alternatives may be combined in a single structural material, for example combining variable clocking with cam gears having different ellipticities.

The beams described above may be wing spars, running along a substantial portion of the span of a wing of a manned or unmanned aircraft. It will be appreciated that the beams described herein may also be used in other sorts of structures. An example of another suitable use for the structural members described herein is in structures used in truck weighing stations, where the need for a damped structure is important.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A structural member comprising:
   an external box structure;
   a beam movable within the box structure; and
   a pressure mechanism that provides variable friction between the box structure and the beam;
   wherein the pressure mechanism includes a series of cams between the beam and the box structure.

2. The structural member of claim 1, wherein the beam is a split beam.

3. The structural member of claim 2, wherein the split beam includes a pair of longitudinally-split beam parts.

4. The structural member of claim 3, wherein each of the beam parts includes multiple segments.

5. The structural member of claim 4, wherein one of the beam parts includes a different number of segments than the other of the beam parts.

6. The structural member of claim 5, the segments of one of the beam parts overlap gaps between segments of the other of the beam parts.

7. The structural member of claim 4, wherein each of the beam parts includes the same number of segments.

8. The structural member of claim 3, further comprising a lubricant layer is located between the beam parts, with the beam parts able to slide relative to each other as the structural member flexes.

9. The structural member of claim 3, the beam parts are shorter than the length of the box, allowing the beam parts to move longitudinally within the box.

10. The structural member of claim 1, wherein the cams are toothed elliptical cam gears that engage toothed or grooved surfaces in the beam and the box structure.

11. The structural member of claim 10, wherein the cam gears vary in configuration as a function of longitudinal distance along the beam.

12. The structural member of claim 11, wherein the cam gears have different ellipticities.

13. The structural member of claim 10, wherein the cam gears vary in orientation as a function of longitudinal distance along the beam.

14. The structural member of claim 1, in combination with a structure root to which the external box is attached.

15. The combination of claim 14,
    wherein the box is attached at a recess in the structure root; and
    wherein a portion of the beam extends into the recess in the structure root.

16. The structural member of claim 1, wherein the pressure mechanism varies the pressure force as a function of flexure of the member.

17. The structural member of claim 1, wherein the external box structure is a rectangular channel.

18. A structural member comprising:
    an external box structure;
    a beam movable within the box structure; and
    a pressure mechanism that provides variable friction between the box structure and the beam;
    wherein the pressure mechanism includes a series of hinged "scissors jack" mechanisms.

19. The structural member of claim 18, wherein the beam is a split beam.

20. The structural member of claim 19, wherein the split beam includes a pair of longitudinally-split beam parts.

21. The structural member of claim 20, wherein each of the beam parts includes multiple segments.

22. The structural member of claim 18, wherein the pressure mechanism varies the pressure force as a function of flexure of the member.

* * * * *